United States Patent [19]
Benson

[11] Patent Number: 5,911,212
[45] Date of Patent: Jun. 15, 1999

[54] PRIORITY VALVE FOR AN INTERCOOLED ENGINE

[76] Inventor: Steven R. Benson, 5919 S. 350 West, P.O. Box 57547, Murray, Utah 84157

[21] Appl. No.: 09/102,146

[22] Filed: Jun. 22, 1998

Related U.S. Application Data

[63] Continuation of application No. 08/650,781, May 20, 1996, abandoned.

[51] Int. Cl.$^6$ .................................................... F02B 29/04
[52] U.S. Cl. ................ 123/563; 137/625.29; 137/625.47
[58] Field of Search ............................... 60/599; 123/563; 137/625.29, 625.32, 625.46, 625.47

[56] References Cited

U.S. PATENT DOCUMENTS

| 2,800,365 | 7/1957 | Hodges | 137/625.47 |
| 3,712,282 | 1/1973 | Isley | 123/563 |

FOREIGN PATENT DOCUMENTS

| 3627686 | 11/1987 | Germany | 123/563 |
| 57-195820 | 12/1982 | Japan | 60/599 |
| 3-260323 | 11/1991 | Japan | 123/563 |

*Primary Examiner*—Michael Koczo
*Attorney, Agent, or Firm*—M. Reid Russell

[57] ABSTRACT

The invention is in a priority valve that includes a housing arranged for in-line mounting between a conventional turbocharging unit of an internal combustion engine, an intercooler and an engine intake manifold to receive a charge air flow, and to either direct that flow directly to an engine intake manifold or to the intercooler, with the flow to pass from the intercooler back through the priority valve and then to the engine intake manifold. The priority valve includes a valve member that is preferably a cylinder and is journaled in the housing to turn between a first position, where the charge air flow, that is received from the turbocharger unit, is directed to the engine intake manifold, and a second position where the received charge air flow is first directed to the intercooler, with that flow passed back to the priority valve from the intercooler and is then passed from the priority valve into the line to the engine intake manifold. The invention may include a solenoid, or the like, connected to operate the cylindrical valve member to move it between its first and second positions, which solenoid, or the like, is operated responsive to a sensing of a set temperature of the charge air flow, by a sensing of a set pressure or above of the charge air flow at the engine inlet manifold, or on command as from a computer, or the like. The cylindrical valve member to have surfaces formed therein that, when the valve member is in its first or second positions, receives the charge air flows thereagainst and redirected each flow out of an appropriate port to create a minimum turbulence in the charge air flow.

6 Claims, 3 Drawing Sheets

PRIORITY VALVE FOR AN INTERCOOLED ENGINE

This is a continuation of application Ser. No. 08/650,781, filed on May 20, 1996, now abandoned.

BACKGROUND OF THE INVENTION

1. Field of the Invention

This invention relates to engine turbo charging systems that employ an innercooler for cooling a pressurized air flow from a turbocharging unit prior to its passage into an engine intake manifold.

2. Prior Art

The present invention is in a valve arrangement for positioning in a turbocharged air flow line between a turbocharger and an intercooler and to an engine intake manifold. A cylinder portion of the valve is operated selectively to pass the turbocharged air flow directly into the intercooler discharge line, by-passing the intercooler, when the temperature of that turbocharger charge air flow is below a set temperature, the engine inlet manifold pressure is at or below a set pressure, or on command. Whereafter, when the charge air flow temperature or manifold pressure passes the set point, or on command, the cylinder portion of the valve is pivoted to direct that turbocharged air flow into the intercooler. The intercooler is not needed during turbo charging start up, when air flow is cool, or manifold pressure is low, or on command shortens the distance the charge air flow must travel providing, thereby instantaneous turbocharger response. Heretofore, applicant believes, a priority valve like that of the invention has not been known.

SUMMARY OF THE INVENTION

It is a principal object of the present invention in a priority valve for use with a turbocharger unit and an intercooler where the valve is positioned in-line to divert a charge air flow whose temperature is below a set limit, or a manifold pressure is set at or below a set pressure, or on command, around the intercooler and directly into the engine intake manifold, with the valve operated to pass the charge air flow into intercooler when the air flow temperature is above the set temperature or manifold pressure, or on command.

Another object of the present invention is to provide a priority valve that is an incline valve arranged between a turbocharger unit and an intercooler to provide for directing that charge air flow directly into the engine intake manifold, and to operate, to direct that charge air flow to the intercooler when the air flow temperature or intake manifold pressure is sensed as being above the set maximum, or on command.

Another object of the present invention is to provide a priority valve that includes, as the air flow directing component, a cylinder journaled within a housing, that is turned between first and second positions responsive to a sensing of a set temperature in the charge air flow, a design intake manifold pressure or on demand to redirect an air flow therethrough from a passage into a line or lines to the engine intake manifold to a line that directs the flow to an intercooler to cool that flow that is then directed to the engine intake manifold.

Still another object of the present invention is to provide a priority valve that is simply and in its construction, is reliably operate to change a flow path therethrough upon sensing of a set temperature of an air flow passed from a turbocharger, set engine intake manifold pressure, or on demand as controlled by a computer, or the like.

Still another object of the present invention is to provide a priority valve that is arranged as an incline valve maintained between a turbocharging unit and an intercooler that is operate to by-pass the intercooler where the flow therethrough is sensed to be below a set temperature based upon a sensing of a set pressure at the engine intake manifold, or on demand and is operated to direct that flow to the intercooler when the temperature of the flow or manifold pressure is above a set point or on demand, and when the valve is positioned to by-pass the intercooler, the valve is arranged to pass a sufficient air flow into the intercooler and lines so as to fill them in anticipation of the charge air flow being directed thereto, providing for a more rapid turbocharger response time than has heretofore been achieved.

In accordance with the above objects the present invention is in a priority valve for inclusion, as a line valve, between an internal combustion engine turbocharging unit and an intercooler. The valve includes a housing that is ported to pass a flow of pressurized air from a turbocharging unit to an intercooler, with a flow from the intercooler to a engine inlet manifold to also pass through ports in the valve housing on turbocharger start up or as directed, the valve is positioned to by-pass the intercooler and pass a charge air flow directly into the line to the engine inlet manifold. A cylinder is arranged as a valve member and is journaled across the valve housing to be positionable between a first position for directing the charge air flow directly to the engine inlet manifold, and is moved to a second position to direct the charge air flow through the housing to the intercooler when the temperature of that flow is sensing as being above a set temperature, when the manifold pressure is sensed to be above or below a set pressure, or on demand. The cylindrical valve member is turned back to its first position where the turbo charged flow is directed into a port that connects through a line directly to the engine inlet manifold, when the air flow temperature is sensed as being less than a set temperature, when the turbo charger unit is first operated upon sensing a manifold pressure, or above or below a set pressure, or on demand and controlled by a computer, or the like, by-passing the intercooler. Accordingly, the priority valve of the invention is operated upon a sensing of a certain manifold pressure condition, or when directed to operate as by a computer. The valve of the invention operates to redirect the air flow to the from passing directly to the engine intake manifold, to travel through the intercooler, providing for an instant response or power surge produced by the engine when turbocharger operation is initiated.

THE DRAWINGS

The following drawings illustrate that which is presently regarded as the best mode for carrying out the invention:

FIG. 1 shows an exploded profile perspective view of a priority valve of the invention removed from its incline mounting between a turbocharger, intercooler and engine intake manifold;

FIG. 2 shows a top plan view of the assembled priority valve of FIG. 1 with a valve body interior and components shown in broken lines, illustrating a cylindrical valve member as being in a and showing, as arrows, a flow of charge air from a turbocharger that is passed into the valve through first position an inlet port and is directed out of a port that connects to the engine intake manifold, by-passing the intercooler;

DETAILED DESCRIPTION

Figure 1:
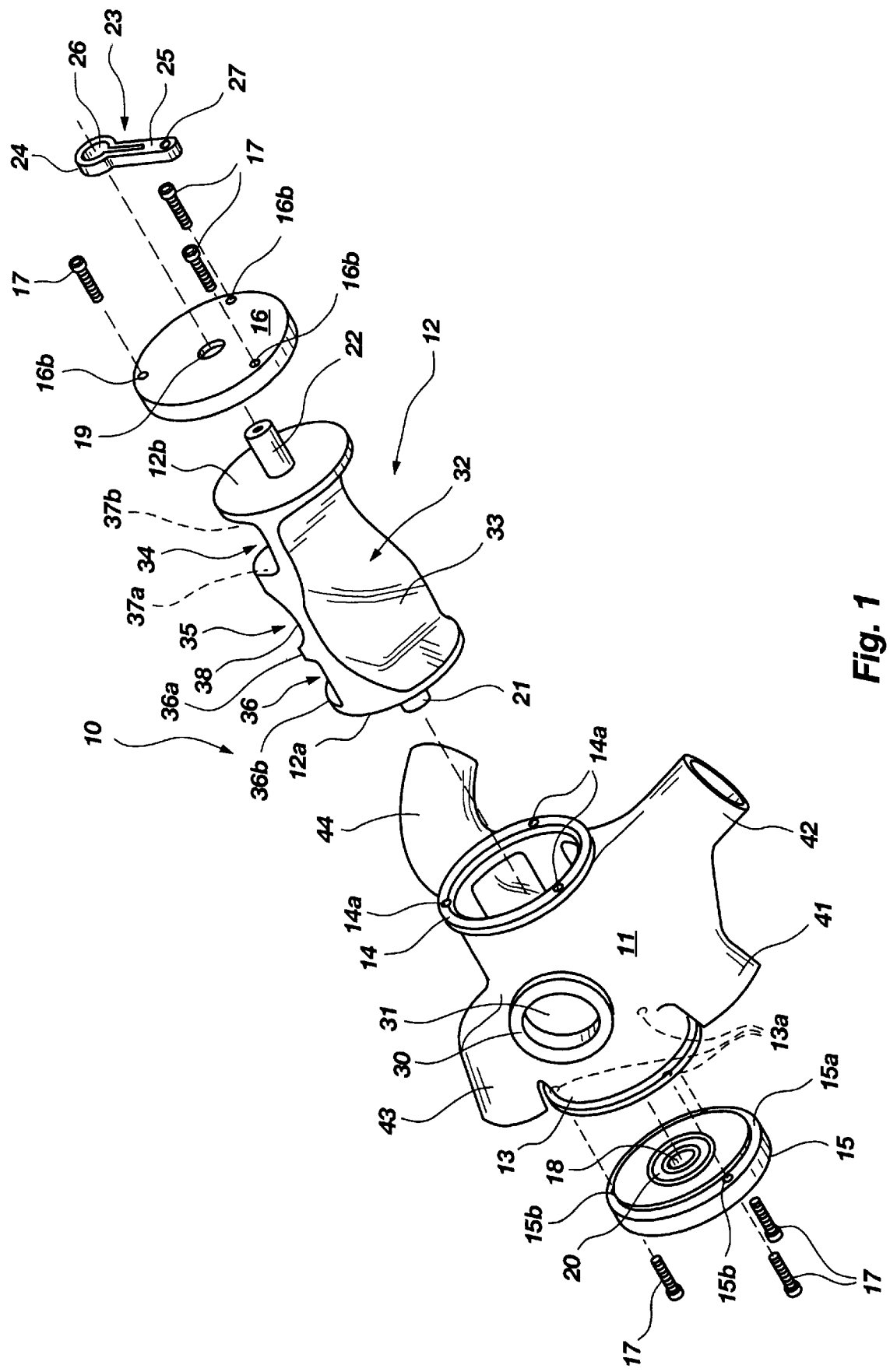

The present invention in a priority valve 10, as shown in FIGS. 1 through 5, is for in-line mounting between an exhaust gas driven turbocharging unit, or the like, and an intercooler that, it should be understood, are preferably standard readily available units selected for a particular engine system. The turbocharging unit is preferably exhaust gas operated by, but may be otherwise operated such as by an electric motor, or the like within the scope of this disclosure, to generate a high pressure output flow of fresh air, hereinafter referred to as charge air flow, that is for passage to an engine inlet manifold of a conventional engine. The conventional engine may be an automobile truck, aircraft, or other engine, that runs on gasoline, diesel, or other appropriate fuel with charge air flow for mixing with a fuel flow to provide increased engine output power or performance.

When operation of a turbocharging unit is first initiated the temperature of the charge air flow will initially be at approximate ambient temperature and the manifold pressure will be below a set point, but both will quickly rise. In practice, to maintain system efficiency, an air flow passed from a turbocharger, after a period of time of operation, will be hot, and therefore it is generally preferably to cool the turbo charged flow before it is introduced into the engine inlet manifold. Such cooling takes place in an intercooler where the flow is passed through coils, the air flow is directed over coils wherethrough ambient air is passed, or the like. The intercooler is provided to reduce the charge air flow temperature that is then directed to the engine intake manifold. In initial operations, where the charge air flow is at low temperature, or when the engine intake manifold pressure is appropriate, or on command, such as by a computer, the intercooler can be by-passed, shortening the distance the charge air flow travels to the engine intake manifold providing a rapid engine response. Further, where engine operation conditions appropriate and an operator desires an increase in response time, or temperature centigrade, a computer type device keeping track of engine conditions can direct such intercooler by-pass, within the scope of this disclosure. Further, for avoiding an initial falling off of performance while the lines to and from the intercooler and the intercooler itself fill with charge air during valve switching from the first to second position, a cylindrical valve member 12 is positioned in a cavity of housing 11 to provide or allow for leakage of the charge air flow into the intercooler inlet and out lines, providing for filling the intercooler itself and its lines to provide for instant response when the cylindrical valve member is switched from its first to its second position.

For the priority valve 10 of the invention, the respective flows from the turbocharging unit to the intercooler and the flow from the intercooler to the engine inlet manifold or manifolds are directed through the priority valve. The priority valve 10 includes the cylindrical valve member 12 that is initially positioned in the first position, directing the charge air flow from the turbocharger unit, shown in FIGS. 2 and 4 as arrow A, therethrough, shown as arrow B, and out ports 41 and 42, that connect into lines, illustrated by arrows C, that connect to the engine inlet manifold or manifolds. When the charge air flow is sensed to be at or above a set temperature, or when other selected condition is the priority valve 10 is operated, as set out below, moving the cylindrical valve member 12 to a second position. The charge air flow is thereby redirected illustrated by arrow A, in FIGS. 3 and 5, to travel out of a port 43 to travel and into a line, illustrated by arrow D, to pass to the intercooler, not shown. The charge air flow is cooled in the intercooler and is then passed through a line, hose or tube, shown as arrow E, back to the priority valve 10, entering through port 44. That flow is directed through the priority valve, shown as arrow F, and out through ports 41 and 42, to the engine inlet manifold. In practice, the priority valve 10 has been set to operate, with the cylindrical valve member 12 moving from a first position to a second position, upon a sensing of a temperature of the charge air flow, or at a set engine r.p.m., or at any time deemed to be appropriate, or at a set time, as appropriate, thereby redirecting the flow, as shown in FIGS. 3 and 5 and describe above, through the intercooler, but may, of course, be set to operate at any appropriate temperature within the scope of this disclosure. The cylindrical valve member 12 is repositioned to the first position, shown in FIGS. 2 and 4, when a temperature of less than the set temperature is sensed. Alternatively, the priority valve 10 can be operated responsive to engine manifold pressure as sensed, for example, by a pressure probe, not shown, fitted into a probe portal 40 shown formed in port 41, the probe for sensing pressure of the turbo charged flow as is delivered to the engine inlet manifold. Further, alternatively, the priority valve, as describe, can be operated, to move the cylindrical valve member so as to change the flow path therethrough, by a computer, or the like, that provides for controlling engine functioning, within the scope of this disclosure.

The above sets out the arrangement of and functioning of the priority valve 10 of the invention is described in relation to a turbocharger unit, intercooler, and engine inlet manifold with the valve member, shown as cylindrical valve member 12, arranged to be operated by a sensing of the charge air flow temperature. While the respective turbocharger unit, intercooler, and engine inlet manifold or manifolds are not shown, it should be understood that such are conventional units as are commonly included with engines for powering autos, truck, boat, aircraft, and/or the like, and accordingly will not be described in further detail herein. It should therefore be understood that the present invention can be included with and for connection to, any appropriate arrangement of engine, turbocharger and intercooler to function as described, within the scope of this disclosure.

A preferred configuration of the priority valve 10 of the invention is shown in the FIGS. 1 through 5 as including the housing 11. The housing 11 is preferably formed as a casting to have an open interior area or cavity, shown in broken lines in FIGS. 2 and 3, wherein cylindrical valve member 12 is journaled between open housing ends 13 and 14, as shown best in FIG. 1. The housing ends 13 and 14, are shown herein to have circular shapes, and are formed with flat outer surfaces to receive, positioned thereover, edges of flat plates 15 and 16, respectively, fitted thereto, as shown best in FIGS. 1 through 3. The respective flat plates 15 and 16 can be slotted around there inner edge, shown at 15a in FIG. 1 and in broken lines in FIGS. 2 and 3, providing a right angle groove therein to step the plate edge from a greater to a lesser diameter so as to allow the plate edge to fit snugly within the housing ends 13 and 14, respectively. Shown in FIG. 1, for securing the flat plates 15 and 16 onto the housing 11 ends 13 and 14, the respective plates each have holes 15b and 16b formed therethrough at equal spaced intervals around the plate edges that are for aligning with equally spaced holes 13a, that are shown in broken lines, formed into the housing ends. The spaced holes 13a and 14a are each preferably threaded to receive a bolt 17 fitted through a hole 15b or 16b that is turned therein, securing the flat plates 15 and 16 onto the housing ends 13 and 14.

Center holes 18 and 19 are formed through the respective flat plates 13 and 14 that are stepped outwardly into cavities in each plate inner surface that are for receiving bearings 20 fitted therein. One of which bearings 20 is shown fitted into plate 13 with, it should be understood, a like bearing 20 preferably being fitted into the cavity in plate 14. Axle ends 21 and 22, respectively, of the cylindrical valve member 12, shown as a stub axle 21 and a pivot axle 22, respectively, extend outwardly at right angles from the centers of opposite cylinder ends 12a and 12b, shown in FIG. 1, and are journaled in the races of bearings 20. So arranged, the stub axle is journaled within the end plate 13, closing the center hole 18, and the pivot axle 22 is shown to extend out of the center hole 19 of end plate 14 and is aligned to receive an operating arm 23, for example, is fitted thereto to operate the cylindrical valve member 12 as described. As shown in FIG. 1, the operating arm 23 is a flat section having a circular end 24 with an elongate section 25 extending therefrom. The circular end 24 includes a hole 26 formed therethrough that is of a diameter to fit over the pivot axle 22 and is arranged to be secured thereto. A hole 27 is formed through an outer end of the elongate section 25 that is to connect to a drive arm, not shown, that is to be operated by a solenoid, or the like, responsive to sensing of a charge air flow temperature, manifold pressure, on command from an engine computer, or the like, as set out above, to move the elongate section 25 so as to pivot the cylindrical valve member 12 between the first and second positions or attitudes shown in FIGS. 4 and 5, and as described above and in detail hereinbelow. Though, it should be understood other arrangements for pivoting the cylindrical valve member 12, as described, could be so employed within the scope of this disclosure.

The solenoid, not shown, or like device, is operated upon a sensing by a thermocouple, or like device, not shown, of a set temperature within the charge air flow may be connected through a V bard flange coupling 30, or the like, that is formed around the housing turbocharged flow inlet 31. Such set temperature is one as is selected above ambient conditions for the particular engine configuration and anticipated operating conditions. Initially, the cylindrical valve member 12 is usually in the first position or attitude shown in FIGS. 2 and 4. Whereafter, when the temperature in the charge air flow exceeds the set temperature, the solenoid, or the like, not shown will be operated to move the elongate section 25 so as to rotate the cylindrical valve member 12 to the second position or attitude, as is shown in FIGS. 3 and 5. The rotation of the cylindrical valve member 12 changes the flow paths through the priority valve 10 as set out above and further described below.

The cylindrical valve member 12 is arranged to turn within the housing 11, between first and second positions, as described, provides for directing the charge air flow through the described ports. Preferably, the flow should not be disrupted as could cause a loss of energy therefrom. Accordingly, the cylindrical valve member 12 is preferably formed to provide smooth flow paths, with a flow path formed to direct the flow to by-pass the intercooler when the valve member is in the first position. Such valve member formation is preferably accomplished by machining a longitudinal section from half the cylinder, to form a curved face 32 formed therealong that, as shown best in FIGS. 1 and 4, has concave sections formed therein, that are each adjacent to a cylinder end, and slope upwardly into a flattened center crest 33. So arranged, the charge air flow passed through the inlet port 31 and will separate at crest 33 into two flows that are directed by the concave sections into the ports 41 and 42 and out therefrom, shown as arrows C. The opposite cylinder valve member 12 half section that is exposed to the flow from the intercooler, when the valve member is in the second position, is formed into side rectangular sections 34 and 36, with the side section 34 arranged as a channel between walls 37b and 37a, and with the side section 36 is removed therefrom to save weight and for balance formed between walls 36b and 36a, shown in FIG. 1, and with a center section 35 formed to have a curved surface thereacross that forms a saddle 38 between arranged upright walls 36a and 37a whose outer edges are the original cylinder surface. The end walls 36b and 37b are thereby to fit snugly against the housing 11 cavity inner surfaces whereacross the cylindrical valve member 12 is journaled. Also, the outer edges of the cylinder valve member ends 12a and 12b, like the edges of end walls 36a and 37a will fit snugly against the housing 11 inner surface whereacross the cylindrical valve member 12 is journaled. The integrity of the turbocharged flow is thereby maintained as it is directed across the cylinder valve member 12 surfaces when the valve member is in the first or second position or attitude. Except there is a sufficient space between the respective walls 36a and 37a and ends 12a and 12b to allow for sufficient bleed by to fill the respective intercooler in part and outlet lines and the intercooler itself, as set out above.

Figure 2:
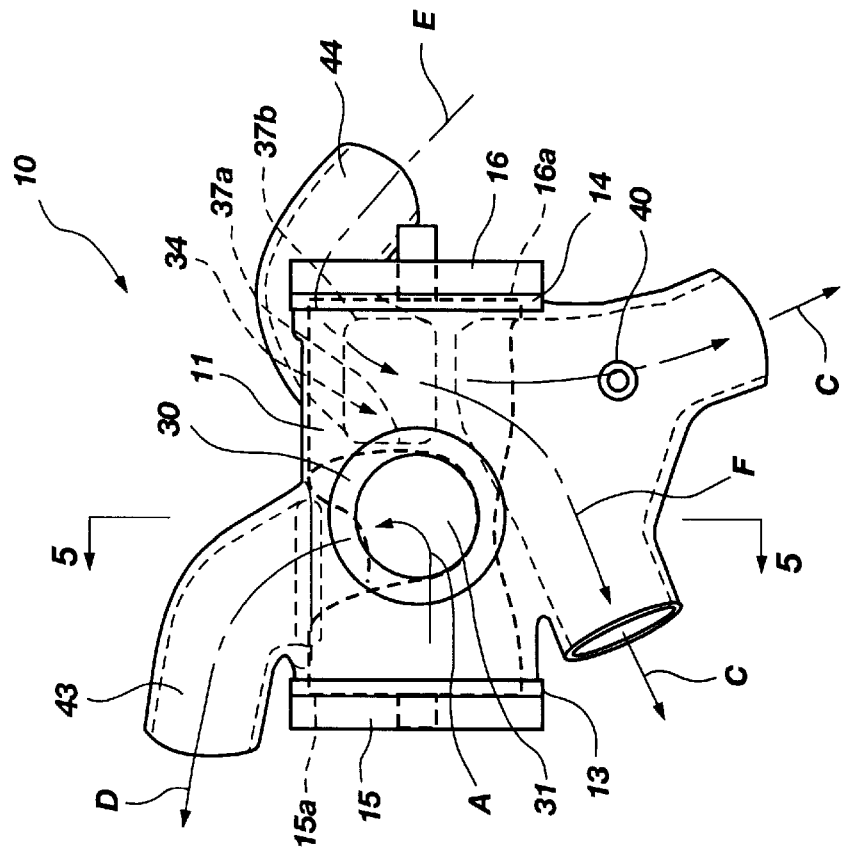
Figure 3:
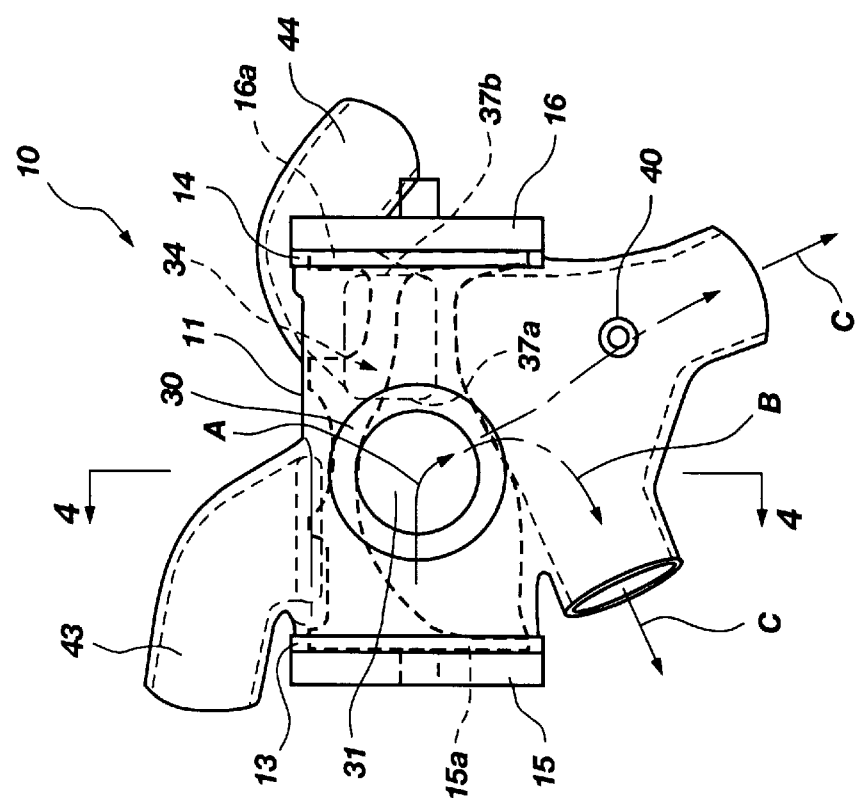
FIG. 3 is a view like FIG. 2, except the cylindrical valve member within the housing has been turned to a second position to redirect the charge air flow, shown as arrows, through a housing port that connects with a line to the intercooler, with a flow from the intercooler, shown also as arrows, directed back through the housing and into the line to the engine inlet manifold.
Figure 4:
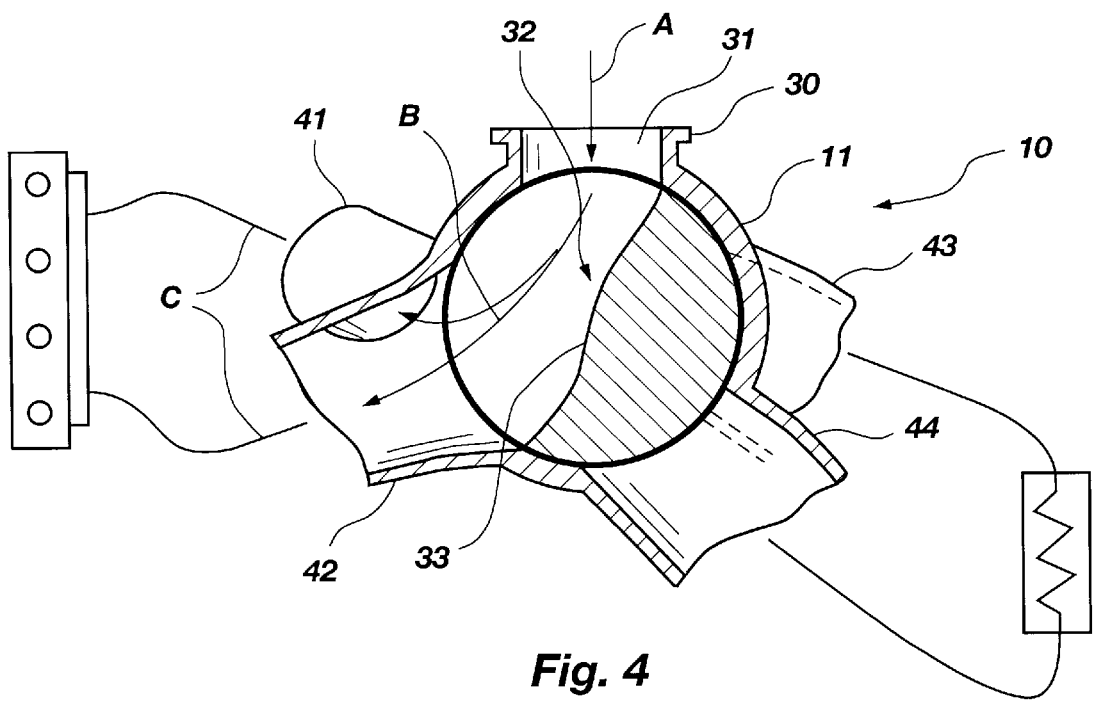
FIG. 4 is an end elevation sectional view taken along the line 4—4 of FIG. 2.
Figure 5:
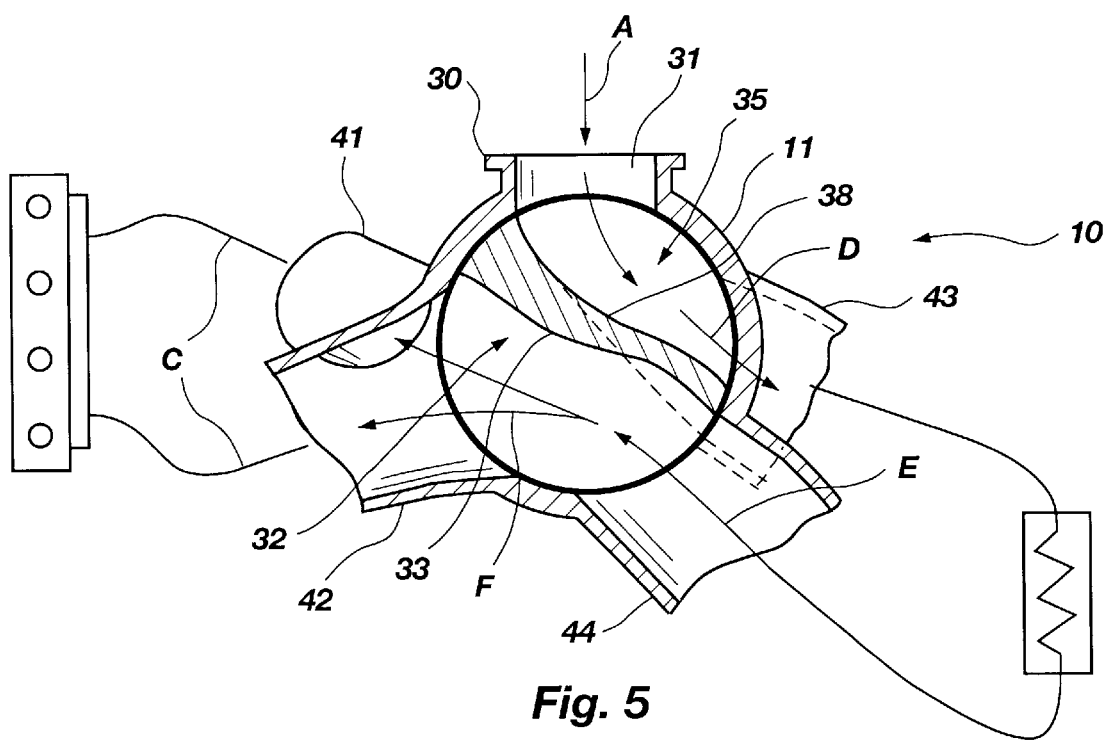
FIG. 5 is an end elevation sectional view taken along the line 5—5 of FIG. 3.

FIGS. 2 and 4 show the cylindrical valve member 12 positioned in the housing 11 such that its curved face 32 is opposite to and receives the charge air flow from the inlet port 31 separating that flow at the flattened crest 33 and directing it into and through the ports 41 and 42. When, as shown in FIGS. 3 and 5, the cylindrical valve member 12 is pivoted to the second position or attitude, the charge air flow from the inlet port 31 is directed by the saddle surface 38 into and through the port 43 that connects into an inlet line to the intercooler, shown as arrow D, and the rectangular section 34 of the cylindrical valve member 12 positioned to receive the flow from the line from the intercooler, arrow E, and to direct it into the ports 41 and 42, that connect to lines, shown with arrows C, to pass that flow to the engine inlet manifold. The rectangular section 34, shown in broken lines in FIG. 3, that is formed between walls 37b and 37a that have outer edges that are in contact with the housing 11 cavity walls, form, essentially, a rectangular tube wherethrough the flow passes, to minimize turbulence. It should be also understood that the outer edges of the walls 36a and 37a, wherebetween the saddle section 38 is formed also engage the housing cavity interior forming essentially a flattened smooth wall tube that also limits a creation of turbulence in the charge air flow. Also, of course, the cylinder valve member ends 12a and 12b outer edges engage the housing cavity walls to direct the charge air flow over the surface face 32, as shown in FIGS. 2 and 4, further minimizing a creation of turbulence in that flow. In practice, the cut out slot, shown as a channel section, 36 is preferably formed to reduce the cylindrical valve member weight and for balancing that cylindrical valve member, or the like.

The respective ports 41, 42, 43 and 44 are shown as having tube shaped ends that, it should be understood, are for receiving tubes, hoses, or the like telescoped thereover that may be maintained in coupling engagement as by installing a hose clamp, or the like, around each of the joined units. So arranged the charge air flow is directed, as set out above from the turbocharger, not shown, and either directly to the engine intake manifold, not shown, or through the intercooler, not shown, and then to the engine intake manifold. The determination of whether the priority valve 10 is operated to by-pass the intercooler, or not, may be made, based upon a sensing of the temperature of the charge air flow, as determining by a thermocouple, or the like, not shown; may be based on the manifold pressure as sensed by a pressure sensor, not shown, that can be installed in port 40, or in other location; or may be made by a determination of a computer, such as an engine computer that is arranged to direct engine operations, or the like, within the scope of this disclosure. Further, where a preferred arrangement of housing 11, formed as a single casting, is shown herein, the housing 11 may be otherwise formed and, where a pair of engine intake manifold ports 41 and 42 are shown, the housing 11 may include one such port only, within the scope of this disclosure. Further, it should be understood, the particularly arrangement of the housing 11, the ports formed therein, and the cylindrical valve member 12 and its arrangement, can be modified from that shown to fit a particular engine arrangement and still be within the scope of this disclosure.

While a preferred embodiment of my invention in a priority valve has been shown and described herein, it should be understood that the present disclosure is made by way of example only and the invention can be reconfigured and the described components rearranged, within the scope of this disclosure, and additionally, that the invention is suitable for uses additional to those described, within the scope of this disclosure, and that variations and changes to the invention in a priority valve of the invention and the components thereof are possible without departing from the subject matter coming within the scope of the following claims, and a reasonable equivalency thereof which claims I regard as my invention.

I claim:

1. A priority valve comprising, a housing having port means formed therein for, respectively, receiving through an inlet port means a charge air flow, and including a valve means that is a cylindrical valve means having essentially parallel ends wherefrom end axle means extend for journaling said cylindrical valve means in said housing to be positionable, alternatively, to a first position, where said charge air flow is directed through a housing manifold port means to direct a charge air flow to an engine intake manifold, and to a second position where said charge air flow is directed through an intercooler port that connects means to direct said charge air flow to an engine intercooler and through said housing manifold port means; means for journaling each said axle means within the housing whereby said cylindrical valve means pivots from said first position to said second position; said housing further including an intercooler output port means that is selectively opened to receive and direct said charge air flow through said housing manifold port means; and means for controlling operation of said cylindrical valve means.

2. A priority valve as recited in claim 1, wherein a longitudinal section of the cylindrical valve means includes a cylindrical body having a curved surface between ends and is journaled at said parallel ends to pivot to the first position to where said curved surface directs the charge air flow through the housing manifold port means.

3. A priority valve as recited in claim 2, further including, a pair of housing manifold port means formed in the housing for individual connection to lines that direct the charge air flow to an engine inlet manifold; and the cylindrical valve member curved surface includes a pair slightly concave areas each formed adjacent to one of the cylindrical valve member parallel ends that each slope toward one another and meet at a flattened center section.

4. A priority valve as recited in claim 1, wherein the cylindrical valve means is formed to fit in the housing to turn freely therein and, with said cylindrical valve means in the first position will allow a small portion of the charge air flow to bleed across said cylindrical valve means.

5. A priority valve comprising, a housing that includes port means formed therein for, respectively, receiving through an inlet port a charge air flow, and directing said charge air flow to a cylindrical valve means journaled in said housing to be alternatively positionable, to a first position where said charge air flow is directed through a housing manifold port means, and to a second position where said charge air flow is directed through an intercooler port means and means for controlling operation of said cylindrical valve means, which said cylindrical valve means includes a cylindrical body having flat parallel ends with a first longitudinal section formed between said ends and a second longitudinal section formed in said cylindrical body that is opposite to said first longitudinal section and is formed to include a center curved portion as a saddle dividing said second longitudinal section into two sections each having an outer edge adjacent to said cylindrical body parallel ends that are proximate to travel over an interior wall of the housing cavity wherein said cylindrical valve means is journaled, which said center curved portion directs said charge air flow entering the housing through said intercooler port means, and a first channel section is formed across said cylindrical valve member means second longitudinal section that directs said charge air flow through said housing manifold port.

6. A priority valve as recited in claim 5, wherein a second section is removed from across the cylindrical valve member means second longitudinal section adjacent to the center curved portion.

* * * * *